US012378502B2

(12) United States Patent
Arata et al.

(10) Patent No.: US 12,378,502 B2
(45) Date of Patent: Aug. 5, 2025

(54) SOFTENING AGENT

(71) Applicant: KAO CORPORATION, Tokyo (JP)

(72) Inventors: Ryuuya Arata, Wakayama (JP); Takako Igarashi, Wakayama (JP); Yuya Kitagawa, Tokyo (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 18/568,953

(22) PCT Filed: Jun. 22, 2022

(86) PCT No.: PCT/JP2022/024846
§ 371 (c)(1),
(2) Date: Dec. 11, 2023

(87) PCT Pub. No.: WO2022/270531
PCT Pub. Date: Dec. 29, 2022

(65) Prior Publication Data

US 2024/0287410 A1 Aug. 29, 2024

(30) Foreign Application Priority Data

Jun. 22, 2021 (JP) ................................ 2021-103530

(51) Int. Cl.

| | |
|---|---|
| ***C11D 3/00*** | (2006.01) |
| ***C11D 3/20*** | (2006.01) |
| ***C11D 3/34*** | (2006.01) |
| ***D06M 11/05*** | (2006.01) |
| ***D06M 13/144*** | (2006.01) |
| ***D06M 13/256*** | (2006.01) |
| *D06M 101/06* | (2006.01) |

(52) U.S. Cl.
CPC .......... *C11D 3/0015* (2013.01); *C11D 3/2013* (2013.01); *C11D 3/3472* (2013.01); *D06M 11/05* (2013.01); *D06M 13/144* (2013.01); *D06M 13/256* (2013.01); *D06M 2101/06* (2013.01); *D06M 2200/50* (2013.01)

(58) Field of Classification Search
CPC ............ C10N 2030/26; C10N 2040/46; C10N 2020/091; C10N 2010/02; C10M 135/10; C10M 105/72; C10M 173/02; C10M 2201/02; C10M 2207/04; C10M 2219/044; C10M 2215/02; C10M 2209/104; C10M 2219/042; C10M 2215/224; C10M 2221/04; C10M 2209/103; C10M 2209/108; C09K 3/32; D06M 13/2246; D06M 13/256; D06M 2200/12; D06M 2200/40
See application file for complete search history.

(56) References Cited

U.S. PATENT DOCUMENTS

| | | | | |
|---|---|---|---|---|
| 5,419,842 | A | 5/1995 | Crutzen | |
| 2007/0214999 | A1 | 9/2007 | Meyer et al. | |
| 2012/0291669 | A1 * | 11/2012 | Busch | C07C 309/17 106/287.24 |
| 2022/0325202 | A1 | 10/2022 | Okamura | |

FOREIGN PATENT DOCUMENTS

| | | | | |
|---|---|---|---|---|
| CH | 705767 | A2 * | 5/2013 | C11D 10/045 |
| CN | 105452434 | A | 3/2016 | |
| CN | 106854567 | A | 6/2017 | |
| CN | 107663772 | A | 2/2018 | |
| CN | 109072129 | A | 12/2018 | |
| CN | 111433338 | A | 7/2020 | |
| EP | 3467081 | A1 | 4/2019 | |
| EP | 3527717 | A1 | 8/2019 | |
| EP | 4079960 | A1 | 10/2022 | |
| EP | 4269547 | A1 | 11/2023 | |
| JP | H05-311575 | A | 11/1993 | |

(Continued)

OTHER PUBLICATIONS

English translation of the International Preliminary Report on Patentability and Written Opinion issued Jan. 4, 2024 in PCT/JP2022/024846, 5 pages.
Combined Chinese Office Action and Search Report issued Mar. 20, 2024 in corresponding Chinese Patent Application No. 202280044423.6 (with English translation), 10 pages.
International Search Report issued Aug. 23, 2022 in PCT/JP2022/024846 (with English translation), 4 pages.
Extended Eurpopean Search Report issued May 23, 2025, in corresponding European Patent Application No. 22828447.7, 8 pages.

*Primary Examiner* — Vishal V Vasisth
(74) *Attorney, Agent, or Firm* — Element 1P, PLC

(57) ABSTRACT

A softening agent includes: a component (A) which is a compound represented by formula (1); and a component (B) which is an alcohol with 6 or more carbons. $R^1$ and $R^2$ each independently represent a hydrocarbon group with 6 or more and 24 or less carbons, with the proviso that at least one of $R^1$ and $R^2$ is a hydrocarbon group having a branch chain; $A^1O$ and $A^2O$ each independently represent an alkyleneoxy group with 2 or more and 4 or less carbons; x1 and x2 each independently represent an average number of added moles, which is a number of 0 or more and 10 or less; and M is a cation.

(1)

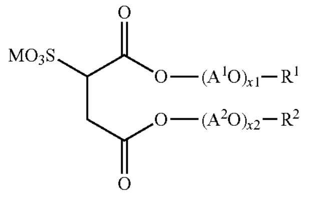

10 Claims, No Drawings

(56) References Cited

FOREIGN PATENT DOCUMENTS

| | | | | |
|---|---|---|---|---|
| JP | H08-158258 | A | | 6/1996 |
| JP | H09-137378 | A | | 5/1997 |
| JP | 2005171399 | A | | 6/2005 |
| JP | 2012172032 | A | * | 9/2012 |
| JP | 2017110328 | A | | 6/2017 |
| JP | 2017214567 | A | | 12/2017 |
| JP | 2018066102 | A | | 4/2018 |
| JP | 2022102519 | A | | 7/2022 |
| KR | 1020150009799 | A | | 1/2015 |
| WO | WO-2016196555 | A1 | | 12/2016 |
| WO | WO-2017204149 | A1 | | 11/2017 |
| WO | WO-2021100691 | A1 | | 5/2021 |
| WO | WO-2021125326 | A1 | | 6/2021 |
| WO | WO-2021187488 | A1 | | 9/2021 |
| WO | WO-2021187489 | A1 | | 9/2021 |
| WO | WO-2022025245 | A1 | | 2/2022 |

* cited by examiner

SOFTENING AGENT

This application is a 371 of PCT/JP2022/024846 filed Jun. 22, 2022.

FIELD OF THE INVENTION

The present invention relates to a softening agent and a method for treating fibers.

BACKGROUND OF THE INVENTION

Textile products such as clothing or the like gradually become stiff and undesirable in texture due to repeated wearing or laundering. In order to improve this, a softening treatment is performed by putting a softening finishing agent in a rinsing process during laundering or the like.

While most of the softening agent compositions currently on the market contain a cationic surfactant as an active component, a softening agent composition containing an anionic surfactant has been considered to date.

JP-A H5-311575 discloses a softening finishing agent for fibers containing, a sulfosuccinic acid ester salt type anionic surfactant, a polyethylene polyamine higher fatty acid amide type cationic surfactant, a nonionic surfactant and polysiloxanes.

JP-A H8-158258 discloses an anti-bacterial softening agent composition containing, an anion-based softening agent composition containing a cation-based bactericidal agent such as benzalkonium chloride or the like, a metal chelating agent and a salt of a dialkyl sulfosuccinic acid having an alkyl group with 16 or more carbons as essential components.

JP-A 2017-214567 discloses a detergent composition for fibers containing an internal olefin sulfonate having 17 or more and 24 or less carbon atoms, a nonionic surfactant and a metal ion chelating agent, wherein the internal olefin sulfonate having a particular carbon chain length has the effect of softening fibers.

JP-A 2018-66102 discloses a fiber modifier which is composed of an internal olefin sulfonate having 17 or more and 24 or less carbons and finishes textile products with a soft texture.

SUMMARY OF THE INVENTION

The present invention provides novel softening agent and method for treating fibers excellent in the effect of imparting softness.

The present invention relates to a softening agent containing (A) a compound represented by the following formula (1) [hereinafter referred to as component (A)], and an alcohol with 6 or more carbons [hereinafter referred to as component (B)], (1)

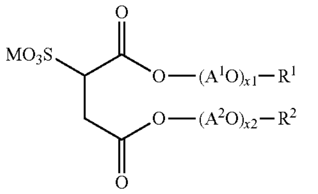

wherein $R^1$ and $R^2$ each represent a hydrocarbon group with 6 or more and 24 or less carbons, with the proviso that at least one of $R^1$ and $R^2$ is a hydrocarbon group having a branch chain, $A^1O$ and $A^2O$ each represent an alkyleneoxy group with 2 or more and 4 or less carbons, x1 and x2 each represent an average number of added moles, which is a number of 0 or more and 10 or less, and M is a cation.

Further, the present invention relates to a method for treating fibers including bringing a treatment liquid into contact with the fibers, the treatment liquid being obtained by mixing the above softening agent with water.

The present invention can provide a softening agent and a method for treating fibers excellent in the effect of imparting softness.

EMBODIMENTS OF THE INVENTION

The softening agent of the present invention can impart excellent softness to fibers by a combined use of component (A) represented by the general formula below and an alcohol with 6 or more carbons of component (B). The reason why the present invention has this effect is uncertain, but it is considered to be as follows.

It is considered that component (A) forms a vesicle in water and this vesicle is unevenly distributed on the surface of fibers when adsorbed to the fibers, thereby allowing fiber softness to be imparted. It is inferred that, when components (A) and (B) are used in combination, a vesicle of component (A) takes in component (B), which does not form a vesicle alone, to change an electric charge, particle size or membrane elasticity of the vesicle and improve its uneven distribution on the surface of fibers, so that an excellent effect of imparting softness is exhibited on the fibers. It is further considered that component (B) does not affect dispersibility in water or the like of component (A) as it does not cause flocculation or the like of component (A) when used in combination with component (A). Therefore, component (B) can be used in combination with component (A) without any particular change in a usage aspect of component (A). Note that the present invention is not restricted by this mechanism.

The softening agent of the present invention contains (A) a compound represented by the following formula (1) [hereinafter referred to as component (A)], and (B) an alcohol with 6 or more carbons [hereinafter referred to as component (B)]. Components (A) and (B) may each include one or more compounds.

The softening agent of the present invention may be a softening agent containing components (A) and (B) as active components.

(1)

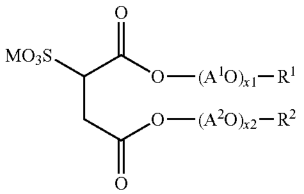

wherein $R^1$ and $R^2$ each represent a hydrocarbon group with 6 or more and 24 or less carbons, with the proviso that at least one of $R^1$ and $R^2$ is a hydrocarbon group having a branch chain, $A^1O$ and $A^2O$ each represent an alkyleneoxy group with 2 or more and 4 or less carbons, x1 and x2 each represent an average number of added moles, which is a number of 0 or more and 10 or less, and M is a cation.

$R^1$ and $R^2$ in the formula (1) may be the same or different, and each represent a hydrocarbon group with 6 or more and 24 or less carbons. Examples of the hydrocarbon group include an alkyl group or an alkenyl group.

The hydrocarbon groups of $R^1$ and $R^2$ in the formula (1) each have 6 or more, preferably 8 or more and more preferably 10 or more carbons from the viewpoint of softening performance, and 24 or less, preferably 20 or less, more preferably 17 or less and further preferably 12 or less carbons from the viewpoint of dispersibility.

$R^1$ and $R^2$ each independently represent preferably a branched hydrocarbon group with 10 or more and 12 or less carbons and more preferably a branched hydrocarbon group with 10 carbons.

A total carbon number of $R^1$ and $R^2$ in the formula (1) is preferably 18 or more and more preferably 20 or more from the viewpoint of softening performance, and preferably 30 or less, more preferably 28 or less, further preferably 26 or less, furthermore preferably 25 or less, furthermore preferably 24 or less, furthermore preferably 22 or less and furthermore preferably 20 or less from the viewpoint of dispersibility. Here, when the softening agent contains two or more compounds of different total carbon numbers of $R^1$ and $R^2$, a total carbon number of $R^1$ and $R^2$ in the softening agent represents a molar average of total carbon numbers of $R^1$ and $R^2$ of those compounds.

While the hydrocarbon groups of $R^1$ and $R^2$ in the formula (1) may be either straight chains or branched chains, at least one of $R^1$ and $R^2$ is a hydrocarbon group having a branch chain from the viewpoint of dispersibility. In other words, at least one of $R^1$ and $R^2$ is a hydrocarbon group having a branch structure.

The hydrocarbon groups of $R^1$ and $R^2$ in the formula (1) may be the same or different. The case where the hydrocarbon groups of $R^1$ and $R^2$ are different is preferable from the viewpoint of softening performance at the time of use of high-hardness water. Further, the case where the hydrocarbon groups of $R^1$ and $R^2$ are the same is preferable from the viewpoints of dispersion stability, ease of production and softening performance at a low concentration. For example, $R^1$ and $R^2$ in the formula (1) may have the same number or different numbers of carbons. The case where $R^1$ and $R^2$ have different numbers of carbons is preferable from the viewpoint of softening performance at the time of use of high-hardness water. Further, the case where $R^1$ and $R^2$ have the same number of carbons is preferable from the viewpoints of dispersion stability, ease of production and softening performance at a low concentration.

The hydrocarbon groups having a branch structure of $R^1$ and $R^2$ in the formula (1) each have preferably 1 or more and 2 or less, more preferably 1 or more and 1.5 or less, further preferably 1 or more and 1.2 or less, furthermore preferably 1 or more and 1.1 or less and furthermore preferably 1 branch from the viewpoints of softening performance and dispersion stability. Here, a number of branches is expressed in terms of a number average number of branches in a hydrocarbon group having a branch structure. $R^1$ and $R^2$ each preferably have 1 branch.

From the viewpoints of softening performance and dispersibility, the hydrocarbon groups of $R^1$ and $R^2$ having a branch structure are each preferably a hydrocarbon group having a branch chain at position 2, more preferably a hydrocarbon group having a branch chain at position 2, the branch chain having 2 or more carbons, further preferably an alkyl group having a branch chain at position 2, the branch chain having 2 or more carbons, furthermore preferably a hydrocarbon group having a branch chain at position 2, the branch chain being derived from a Guerbet alcohol and furthermore preferably a hydrocarbon group having a branch chain only at position 2, the branch chain being derived from a Guerbet alcohol.

Note that, in the present invention, with carbon of $R^1$ or $R^2$ bonded to 0 of $—O—R^1$ and $—O—R^2$ in the formula (1) as carbon at position 1, carbon bonded to the carbon at position 1 is referred to as carbon at position 2, carbon bonded to the carbon at position 2 is referred to as carbon at position 3 and carbon bonded to the carbon at position 3 is referred to as carbon at position 4, and the same applies to carbon at any of subsequent positions such as carbon at position 5, carbon at position 6 or the like. In other words, the longest main chain including the carbon at position 1 is selected, and position 2 and subsequent carbon positions of carbon positions in $R^1$ and $R^2$ are determined on the basis of that main chain.

From the viewpoint of softening performance, a proportion of a hydrocarbon group having a branch structure on carbon at position 2 or any of subsequent positions and having only one methyl group bonded to carbon at position 2 (hereinafter described also as hydrocarbon group B2 of $R^1$ and $R^2$) in the hydrocarbon groups having a branch structure of the hydrocarbon groups of $R^1$ and $R^2$ in the formula (1) is preferably 5 mol % or less, more preferably 4 mol % or less, further preferably 3 mol % or less, furthermore preferably 2 mol % or less, furthermore preferably 1 mol % or less and furthermore preferably 0 mol % in all the hydrocarbon groups of $R^1$ and $R^2$.

Hydrocarbon group B2 of $R^1$ and $R^2$ is a hydrocarbon group represented by the formula (2):

Formula (2)

$$—CH_2—CH(CH_3)—R^{21}$$

wherein $R^{21}$ is a hydrocarbon group with 3 or more and 21 or less carbons.

$R^{21}$ is preferably an alkyl group, more preferably a straight chain alkyl group and further preferably a primary straight chain alkyl group from the viewpoint of availability.

$R^{21}$ in the formula (2) has preferably 5 or more and more preferably 6 or more carbons from the viewpoint of softening performance, and preferably 17 or less and more preferably 14 or less carbons from the viewpoint of dispersibility.

From the viewpoint of softening performance, a proportion of a hydrocarbon group having a branch structure only on carbon at position 3 or any of subsequent positions and having only one methyl group bonded to carbon at position 3 (hereinafter described also as hydrocarbon group B3 of $R^1$ and $R^2$) in the hydrocarbon groups having a branch structure of the hydrocarbon groups of $R^1$ and $R^2$ in the formula (1) is preferably 10 mol % or less, more preferably 5 mol % or less, further preferably 2 mol % or less, furthermore preferably 1 mol % or less and furthermore preferably 0 mol % in all the hydrocarbon groups of $R^1$ and $R^2$.

Hydrocarbon group B3 of $R^1$ and $R^2$ is a hydrocarbon group represented by the formula (3):

Formula (3)

$$—R^{31}—CH(CH_3)—R^{32}$$

wherein $R^{31}$ is a straight chain hydrocarbon group with 2 carbons, $R^3$ is a hydrocarbon group and $R^{31}$ and $R^{32}$ have 4 or more and 22 or less carbons in total.

$R^{31}$ is preferably an ethanediyl group from the viewpoint of availability, and $R^3$ is preferably an alkyl group, more preferably a straight chain alkyl group and further preferably a primary straight chain alkyl group from the viewpoint of availability.

A total carbon number of $R^{31}$ and $R^{32}$ in the formula (3) is 4 or more, preferably 6 or more and more preferably 8 or more from the viewpoint of softening performance, and 22 or less, preferably 18 or less and more preferably 15 or less from the viewpoint of dispersibility.

From the viewpoint of softening performance, a proportion of a hydrocarbon group having a branch structure only on carbon at position 4 or any of subsequent positions and having only one methyl group bonded to carbon at a branch position of the smallest number (hereinafter described also as hydrocarbon group B4 of $R^1$ and $R^2$) in the hydrocarbon groups having a branch structure of the hydrocarbon groups of $R^1$ and $R^2$ in the formula (1) is preferably 50 mol % or less, more preferably 40 mol % or less, further preferably 30 mol % or less, furthermore preferably 20 mol % or less, furthermore preferably 10 mol % or less, furthermore preferably 5 mol % or less, furthermore preferably 1 mol % or less and furthermore preferably 0 mol % in all the hydrocarbon groups of $R^1$ and $R^2$.

Hydrocarbon group B4 of $R^1$ and $R^2$ is a hydrocarbon group represented by the formula (4):

Formula (4)

$$—R^{41}—CH(CH_3)—R^{42}$$

wherein $R^{41}$ is a straight chain hydrocarbon group with 3 or more carbons, $R^2$ is a hydrocarbon group and $R^{41}$ and $R^{42}$ have 4 or more and 22 or less carbons in total.

$R^{41}$ is preferably an alkane-α,ω-diyl group with 3 or more carbons from the viewpoint of availability, and $R^{42}$ is preferably an alkyl group, more preferably a straight chain alkyl group and further preferably a primary saturated straight chain alkyl group from the viewpoint of availability.

A total carbon number of $R^{41}$ and $R^{42}$ in the formula (4) is 4 or more, preferably 6 or more and more preferably 8 or more from the viewpoint of softening performance, and 22 or less, preferably 18 or less and more preferably 15 or less from the viewpoint of dispersibility.

A proportion of a hydrocarbon group having a branch structure on carbon at position 2 or any of subsequent positions and having only one methyl group bonded to carbon at position 2, a proportion of a hydrocarbon group having a branch structure only on carbon at position 3 or any of subsequent positions and having only one methyl group bonded to carbon at position 3, a proportion of a hydrocarbon group having a branch structure only on carbon at position 4 or any of subsequent positions and having only one methyl group bonded to carbon at a branch position of the smallest number or the like relative to all the hydrocarbon groups of $R^1$ and $R^2$ can each be measured with $^{13}$C-NMR after a compound represented by the formula (1) is hydrolyzed or the like to convert —O—$R^1$ and —O—$R^2$ into alcohols H—O—$R^1$ and H—O—$R^2$, respectively.

According to a measurement result of $^{13}$C-NMR under the conditions below, a proportion of an area of a region of a signal in the range of 67.6 to 68 ppm relative to areas of regions of all the signals from 60 to 69 ppm of component (A) is preferably 5% or less, more preferably 4% or less, further preferably 3% or less, furthermore preferably 2', or less, furthermore preferably 1% or less and furthermore preferably 0%. Note that, in the following $^{13}$C-NMR, multiple branched alcohols having a methyl branch can be used as standard substances to determine a chemical shift of carbon at position 1, and this can be utilized to predict a chemical shift of a sample.

$^{13}$C-NMR Measurement Conditions

Instrument: MR400 manufactured by Agilent Technologies, Inc.
Frequency: 400 MHz
Cumulative number: 1024
Waiting time: 30 sec
Pulse angle: 45 deg
Heavy solvent: $CDCl_3$
Sample concentration: 10%
Sample tube: 5 mmφ

According to a measurement result of $^{13}$C-NMR under the above conditions, a proportion of an area of a region of a signal in the range of 60 to 61 ppm relative to areas of regions of all the signals from 60 to 69 ppm of component (A) is preferably 10% or less, more preferably 5% or less, further preferably 2% or less, furthermore preferably 1% or less and furthermore preferably 0%.

According to a measurement result of $^{13}$C-NMR under the above conditions, a proportion of an area of a region of a signal in the range of 62 to 63.2 ppm relative to areas of regions of all the signals from 60 to 69 ppm of component (A) is preferably 50% or less, more preferably 40% or less, further preferably 30% or less, furthermore preferably 20% or less, furthermore preferably 10% or less, furthermore preferably 5%, or less, furthermore preferably 1%, or less and furthermore preferably 0%.

The hydrocarbon groups having a branch structure included in the hydrocarbon groups of $R^1$ and $R^2$ in the formula (1) have a degree of branching of $R^1$ and $R^2$ defined by the formula below of preferably 0.3 or less, more preferably 0.2 or less and further preferably 0.1 or less from the viewpoint of softening performance, and preferably 0.01 or more, more preferably 0.02 or more and further preferably 0.04 or more from the viewpoint of dispersibility.

$$\text{Degree of branching} = [(\text{total number of terminal methyl groups in } R^1 \text{ and } R^2) - 2] / (\text{total carbon number of } R^1 \text{ and } R^2)$$

Note that a degree of branching can be calculated by using an average value of carbon numbers measured with $^1$H-NMR.

When the hydrocarbon groups of $R^1$ and $R^2$ in the formula (1) include a hydrocarbon group having an unsaturated bond, the unsaturated bond in the hydrocarbon groups of $R^1$ and $R^2$ is preferably a carbon-carbon double bond from the viewpoints of softening performance and dispersion stability.

When the hydrocarbon groups of $R^1$ and $R^2$ in the formula (1) include a hydrocarbon group having an unsaturated bond, a number of unsaturated bonds in the hydrocarbon groups of $R^1$ and $R^2$ is preferably 0.5 or more and 2 or less, more preferably 1 or more and 1.5 or less, further preferably 1 or more and 1.2 or less, furthermore preferably 1 or more and 1.1 or less and furthermore preferably 1 from the viewpoints of softening performance, dispersion stability and availability. Here, a number of unsaturated bonds is expressed in terms of a number average number of unsaturated bonds in the hydrocarbon group having an unsaturated bond.

When the hydrocarbon groups of $R^1$ and $R^2$ in the formula (1) include a hydrocarbon group having a double bond, the preferable range of a number of double bonds in the hydrocarbon groups of $R^1$ and $R^2$ is the above preferable range of a number of unsaturated bonds.

Component (A) may be one or more compounds represented by the formula (1) selected from a compound in which $R^1$ and $R^2$ represent a hydrocarbon group of the same structure and a compound in which $R^1$ and $R_2$ represent hydrocarbon groups of different structures.

Component (A) is preferably a compound in which $R^1$ and $R^2$ represent a hydrocarbon group of the same structure from the viewpoint of softening performance.

Component (A) may be a compound in which $R^1$ and $R^2$ represent hydrocarbon groups of different structures from the viewpoint of softening performance.

For example, the softening agent of the present invention can contain a compound of the formula (1) in which $R^1$ and R represent a hydrocarbon group of the same structure and a compound of the formula (1) in which $R^1$ and $R^2$ represent hydrocarbon groups of different structures.

$A^1O$ and $A^2O$ in the formula (1) each independently represent an alkyleneoxy group with 2 or more and 4 or less carbons. $A^1O$ and $A^2O$ each have 2 or more and 4 or less and preferably 2 or more and 3 or less carbons from the viewpoint of softening performance. $A^1O$ and $A^2O$ each represent preferably an alkyleneoxy group with 2 or 3 carbons. Note that $A^1O$ and $A^2$ represent alkylenes of $A^1O$ and $A^2O$, respectively, and preferable ranges of carbon numbers thereof are the same as the preferable ranges of carbon numbers of $A^1O$ and $A^2O$, respectively.

x1 and x2 in the formula (1) are average numbers of added moles of $A^1O$ and $A^2O$, respectively. x1 and x2 each represent 0 or more and 10 or less, and from the viewpoint of softening performance, preferably 6 or less, more preferably 4 or less, further preferably 2 or less and furthermore preferably 0.

M in the formula (1) is a cation (provided that a hydrogen ion is excluded). Examples of M include, for example, an alkali metal ion such as a lithium ion, a sodium ion, a potassium ion or the like, an alkaline earth metal ion such as a calcium ion, a barium ion or the like, an organic ammonium ion such as a triethanolammonium ion, a diethanolammonium ion, a monoethanolammonium ion, a trimethylammonium ion, a monomethylammonium ion or the like and others.

M is preferably an alkali metal ion or an alkanol ammonium ion, more preferably a sodium ion, a potassium ion, a triethanolammonium ion, a diethanolammonium ion or a monoethanolammonium ion and further preferably a sodium ion from the viewpoints of dispersion stability and softening performance.

Component (A) of the present invention is preferably a compound represented by the following formula (1-1). In other words, the present invention provides a softening agent containing a compound represented by the following formula (1-1) as component (A). A compound of the formula (1-1) is a compound of the formula (1) in which x1 and x2 each represent 0.

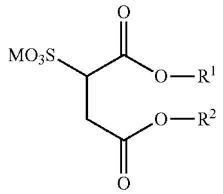

(1-1)

wherein $R^1$ and $R^2$ each represent a hydrocarbon group with 6 or more and 24 or less carbons, with the proviso that at least one of $R^1$ and $R^2$ is a hydrocarbon group having a branch chain, and M is a cation.

The specific examples or preferable examples of $R^1$, $R^2$ and M in the formula (1-1) are the same as in the formula (1).

Component (A) can be synthesized by a publicly-known method. For example, it can be obtained by reacting a diester maleate obtained by reacting maleic anhydride and an alcohol with hydrogen sulfite. At that time, a compound of the formula (1) in which $R^1$ and $R^2$ represent hydrocarbon groups of different structures can be obtained by using alcohols of different carbon numbers or structures. Component (A) can be synthesized, for example, by the processes described in Examples 2 to 3 of US-A 2007/0214999.

Examples of a suitable alcohol used for producing component (A) include:

(1) a primary alcohol represented by 2-propylheptan-1-ol, 2-butyloctan-1-ol, a branched chain decyl alcohol (for example, decyl alcohol manufactured by KH Neochem Co., Ltd.) or the like; and (2) a secondary alcohol represented by 5-nonanol, 2,6-dimethyl-4-heptanol or the like.

From the viewpoints of dispersibility and softening performance, component (A) is preferably one or more selected from a di(2-propylheptyl)sulfosuccinate, a di(isodecyl) sulfosuccinate and a di(2-butyloctyl)sulfosuccinate and more preferably a di(2-propylheptyl)sulfosuccinate. These salts are preferably alkali metal salts or alkanolamine salts, more preferably sodium salts, potassium salts, triethanolamine salts, diethanolamine salts or monoethanolamine salts and further preferably sodium salts.

Component (B) is an alcohol with 6 or more carbons. Component (B) may be an aliphatic alcohol with 6 or more carbons. Further, component (B) may be an alcohol with 6 or more and 14 or less carbons.

Component (B) has 6 or more and preferably 8 or more, and preferably 14 or less and more preferably 12 or less carbons from the viewpoints of dispersibility and softening performance. Examples of component (B) include one or more selected from aliphatic primary alcohols such as, for example, 1-heptanol, 1-octanol, 1-nonanol, 1-decanol, 1-undecanol, 1-dodecanol, 1-tridecanol, 1-tetradecanol and others.

Component (B) is one or more selected from preferably monohydric aliphatic primary alcohols with 6 or more and 14 or less carbons and more preferably monohydric aliphatic primary alcohols with 8 or more and 14 or less carbons from the viewpoints of dispersibility and softening performance.

A content of component (A) in the softening agent of the present invention is preferably 1 mass % or more, more preferably 2 mass % or more and further preferably 3 mass % or more from the viewpoints of dispersibility and softening performance, and 10 mass % or less, more preferably 7 mass % or less and further preferably 5 mass % or less from the viewpoints of dispersibility and viscosity.

A content of component (B) in the softening agent of the present invention is preferably 0.1 mass % or more, more preferably 0.5 mass, or more and further preferably 1 mass, or more from the viewpoint of softening performance, and preferably 5 mass % or less, more preferably 3 mass % or less and further preferably 1 mass % or less from the viewpoint of dispersibility.

A proportion of component (B) relative to a total of 100 parts by mass of components (A) and (B) is preferably 10 parts by mass or more and more preferably 20 parts by mass or more from the viewpoints of dispersibility and softening performance, and preferably 50 parts by mass or less, more preferably 45 parts by mass or less, further preferably 40 parts by mass or less, furthermore preferably 30 parts by mass or less and furthermore preferably 25 parts by mass or less from the same viewpoints.

A proportion of component (B) relative to a total of 100 parts by mass of components (A) and (B) is preferably larger from the viewpoint of reducing costly component (A).

The softening agent of the present invention can also optionally contain a surfactant of those listed below (provided that component (A) is excluded). A proportion of component (A) in all the surfactants contained in the softening agent of the present invention is preferably 50 mass % or more, more preferably 70 mass % or more, further preferably 80 mass % or more, furthermore preferably 90 mass or more and furthermore preferably 95 mass' or more from the viewpoints of dispersibility and softening performance, and preferably 100 mass % or less from the viewpoint of softening performance. When the softening agent of the present invention optionally contains a surfactant (provided that component (A) is excluded), a proportion of component (A) in all the surfactants may be 95 mass % or less, 90 mass % or less and 85 mass % or less. Note that, in the present invention, component (B) is not considered as a surfactant.

In addition to a surfactant of those listed below (provided that component (A) is excluded), the softening agent of the present invention can contain silicone or an organic solvent as an optional component in the range that the effect of the present invention is not hindered.

Examples of the surfactant can include a nonionic surfactant, an anionic surfactant (provided that component (A) is excluded, and the same applies hereinafter), a cationic surfactant and an amphoteric surfactant, and from the viewpoints of dispersibility and softening performance, one or more selected from a nonionic surfactant and an anionic surfactant are preferable and a nonionic surfactant is more preferable.

Examples of the nonionic surfactant can include, for example, an alkyl monoglyceryl ether, a polyoxyalkylene monoalkyl or alkenyl ether, an alkyl (poly)glycoside (a glycoside-type nonionic surfactant), a sorbitan-based nonionic surfactant, an aliphatic alkanol amide, a fatty acid monoglyceride, a sucrose fatty acid ester, an amidated product of an alkanolamine such as monoethanolamine, diethanolamine, methyl monoethanolamine or the like with a fatty acid such as lauric acid, myristic acid or the like and others.

An alkyl group or an alkenyl group of the nonionic surfactant is, for example, an alkyl group or an alkenyl group with 6 or more and 18 or less carbons. An average number of added moles of an oxyalkylene group, for example, an oxyethylene group, of the nonionic surfactant is, for example, 2 or more and 25 or less.

From the viewpoints of dispersibility and softening performance, the nonionic surfactant is preferably one or more selected from a polyalkylene alkyl ether, a sorbitan fatty acid ester, a polyoxyalkylene sorbitan fatty acid ester and a pentaerythritol fatty acid ester and more preferably one or more selected from a polyoxyalkylene mono fatty acid, a sorbitan mono fatty acid ester and a polyoxyalkylene sorbitan mono fatty acid ester. A fatty acid may be a fatty acid having a saturated or unsaturated hydrocarbon group. Further, a fatty acid has, for example, 7 or more and 19 or less and preferably 10 or more and 14 or less carbons. An average number of added moles of an oxyalkylene group is, for example, 2 or more and 25 or less and preferably 2 or more and 21 or less. The oxyalkylene group is preferably an oxyethylene group.

Specifically, the nonionic surfactant is one or more selected from polyoxyethylene monolauryl ether, sorbitan monolaurate, sorbitan monooleate, polyoxyethylene sorbitan monolaurate and polyoxyethylene sorbitan monooleate from the viewpoints of dispersibility and softening performance. An average number of added moles of an oxyethylene group is, for example, 2 or more and 25 or less and preferably 2 or more and 21 or less.

The nonionic surfactant is more preferably one or more selected from a polyoxyethylene monolauryl ether in which an average number of added moles of an oxyethylene group is 2, 4 or 21, sorbitan monolaurate, sorbitan monooleate, a polyoxyethylene sorbitan monolaurate in which an average number of added moles of an oxyethylene group is 20 and a polyoxyethylene sorbitan monooleate in which an average number of added moles of an oxyethylene group is 6. The nonionic surfactant is further preferably one or more selected from a polyoxyethylene monolauryl ether in which an average number of added moles of an oxyethylene group is 2 or 4, sorbitan monolaurate, sorbitan monooleate, a polyoxyethylene sorbitan monolaurate in which an average number of added moles of an oxyethylene group is 20 and a polyoxyethylene sorbitan monooleate in which an average number of added moles of an oxyethylene group is 6, furthermore preferably one or more selected from a polyoxyethylene monolauryl ether in which an average number of added moles of an oxyethylene group is 4, sorbitan monolaurate, a polyoxyethylene sorbitan monolaurate in which an average number of added moles of an oxyethylene group is 20 and a polyoxyethylene sorbitan monooleate in which an average number of added moles of an oxyethylene group is 6, furthermore preferably one or more selected from a polyoxyethylene sorbitan monolaurate in which an average number of added moles of an oxyethylene group is 20 and a polyoxyethylene sorbitan monooleate in which an average number of added moles of an oxyethylene group is 6 and furthermore preferably a polyoxyethylene sorbitan monooleate in which an average number of added moles of an oxyethylene group is 6.

Examples of the anionic surfactant [provided that component (A) is excluded] can include, for example, an alkyl sulfate, a polyoxyalkylene alkyl ether sulfate, an alkane sulfonate, an alkylbenzene sulfonate, a higher fatty acid or a salt thereof, a polyoxyethylene alkyl ether carboxylic acid or a salt thereof, an N-acyl amino acid or a salt thereof, an alkyl phosphate, a polyoxyethylene alkyl ether phosphate or the like. An alkyl group of the anionic surfactant is, for example, an alkyl group with 8 or more and 20 or less carbons. An average number of added moles of an oxyalkylene group, for example, an oxyethylene group, of the anionic surfactant is, for example, 0 or more and 4 or less and preferably more than 0 and 4 or less. A salt of the anionic surfactant is, for example, an alkali metal salt such as a sodium salt, a potassium salt or the like.

Examples of the amphoteric surfactant can include, for example, an N-alkanoylaminopropyl-N,N-dimethylamine oxide, an N-alkyl-N,N-dimethylamine oxide, an N-alkanoylaminopropyl-N,N-dimethyl-N-carboxymethyl ammonium betaine, an N-alkyl-N,N-dimethyl-N-carboxymethyl ammonium betaine, an N-alkyl-N,N-dimethyl-N-sulfopropyl ammonium sulfobetaine, an N-alkyl-N,N-dimethyl-N-(2-hydroxysulfopropyl) ammonium sulfobetaine, an N-alkanoylaminopropyl-N,N-dimethyl-N-sulfopropyl ammonium sulfobetaine, an N-alkanoylaminopropyl-N,N-dimethyl-N-(2-hydroxysulfopropyl) ammonium sulfobetaine or the like. In these, an alkanoyl group is, for example, lauroyl or myristyroyl. Further, in these, an alkyl group is, for example, a lauryl group or a myristyl group.

Examples of the silicone include one or more selected from, for example, a dimethicone such as a dimethicone of a high molecular weight type, a dimethicone of a low molecular weight type or the like and an amino-modified silicone from the viewpoints of dispersibility and softening performance, and a dimethicone of a high molecular weight type is preferable.

A dimethicone may be a dimethicone with a kinematic viscosity at 25° C. of 100 $mm^2/S$ or more and 1,000,000 $mm^2/S$ or less. An example of the dimethicone of a high molecular weight type is, for example, a dimethicone with a kinematic viscosity at 25° C. of 475,000 $mm^2/S$ or more and 525,000 $mm^2/S$ or less. Further, an example of the dimethicone of a low molecular weight type is a dimethicone with a kinematic viscosity at 25° C. of 330 $mm^2/S$ or more and 370 $mm^2/S$ or less. The kinetic viscosities at 25° C. of the dimethicones are measured by 5.5 viscosity measurement method (the first method: capillary viscometer method) in the Standards for Quasi-drug Ingredients 2021.

The amino-modified silicone may be an amino-modified silicone with an amine equivalent of 500 g/mol or more and 55,000 g/mol or less. An example of the amino-modified silicone is an amino-modified silicone with an amine equivalent of 3,000 g/mol or more and 10,000 g/mol or less. An amine equivalent of the amino-modified silicone is a numerical value obtained by dividing a molecular weight of a modified product by a number of functional groups.

Examples of the organic solvent include, for example, butyldiglycol (BDG), propylene glycol (PG), ethanol and isopropanol. The organic solvent may be an organic solvent with 5 or less carbons. However, in the composition of the present invention, these optional components do not contribute to essential improvement in softening performance.

The softening agent of the present invention can contain water. The softening agent of the present invention can contain water in an amount of, for example, 70 mass % or more, further 80 mass % or more and further 90 mass % or more, and 99 mass % or less, further 96 mass % or less and further 93 mass % or less. Further, water may be the balance of a composition containing component (A), component (B) and an optional component.

The softening agent of the present invention can be directed to various kinds of fibers, for example, natural fibers, synthetic fibers and semi-synthetic fibers. Further, the softening agent of the present invention can be directed to a textile product containing these fibers.

The fibers may be either hydrophobic fibers or hydrophilic fibers. Examples of the hydrophobic fibers include, for example, protein fibers (milk protein casein fiber, promix or the like), polyamide fibers (nylon or the like), polyester fibers (polyester or the like), polyacrylonitrile fibers (acrylic or the like), polyvinyl alcohol fibers (vinylon or the like), polyvinyl chloride fibers (polyvinyl chloride or the like), polyvinylidene chloride fibers (vinylidene or the like), polyolefin fibers (polyethylene, polypropylene or the like), polyurethane fibers (polyurethane or the like), polyvinyl chloride/polyvinyl alcohol copolymer fibers (Polyclar or the like), polyalkylene paraoxybenzoate fibers (benzoate or the like), polyfluoroethylene fibers (polytetrafluoroethylene or the like) and others.

Examples of the hydrophilic fibers include, for example, seed hair fibers (cotton, kapok or the like), bast fibers (hemp, flax, ramie, cannabis, jute or the like), leaf vein fibers (manila hemp, sisal hemp or the like), palm fibers, juncus, straw, animal hair fibers (wool, mohair, cashmere, camel hair, alpaca, vicuna, angora or the like), silk fibers (domestic silk and wild silk), feather, cellulose fibers (rayon, polynosic, cupro, acetate or the like) and others.

The fibers are preferably fibers containing cotton fiber. A content of cotton fiber in the fibers is preferably 5 mass % or more, more preferably 10 mass % or more, further preferably 15 mass, or more, furthermore preferably 20 mass, or more and furthermore preferably 100 mass % from the viewpoint of more improving fiber softness.

In the present invention, textile product means textiles such as a woven material, a knitted material, a nonwoven fabric and others using the above hydrophobic fibers or hydrophilic fibers and products obtained by using them, such as an undershirt, a T-shirt, a dress shirt, a blouse, slacks, a cap, a handkerchief, a towel, knitwear, socks, underwear, tights and others. From the viewpoint of being more likely to feel the effect of improving texture of fibers after treatment with a treatment liquid containing the softening agent of the present invention, preferable textile products are cloth such as a woven material, a knitted material or the like and a woven textile, and from the same viewpoint, a preferable textile product is a textile product containing cotton fiber and more preferably cloth or a textile formed by weaving cotton fiber. The preferable aspect of a content of cotton fiber in the textile product is the same as in the above content of cotton fiber in the fibers.

[Method for Treating Fibers]

The present invention provides a method for treating fibers including bringing a treatment liquid into contact with the fibers, the treatment liquid being obtained by mixing the softening agent of the present invention with water.

Further, the present invention provides a method for treating fibers including treating the fibers with the softening agent of the present invention, wherein components (A) and (B) are used in an amount that a total treatment concentration is from 0.01% o.w.f. or more to 5% o.w.f. or less relative to the fibers. Further, the present invention may be a method for treating fibers including treating the fibers with the softening agent of the present invention, wherein components (A) and (B) are used in an amount that a total treatment concentration is from 0.05% o.w.f. or more to 5% o.w.f. or less relative to the fibers. The matters stated in the softening agent of the present invention can be appropriately applied to the method for treating fibers of the present invention. The specific examples, preferable aspects or the like of components (A) and (B) are also the same as in the softening agent of the present invention.

The method for treating fibers of the present invention may be a method for treating fibers including, applying components (A) and (B) in an amount that a total treatment concentration is from 0.01% o.w.f. or more to 5% o.w.f. or less relative to the fibers to impart softness to the fibers. Further, the method for treating fibers of the present invention may be a method for treating fibers including, applying components (A) and (B) in an amount that a total treatment concentration is from 0.05% o.w.f. or more to 5% o.w.f. or less relative to the fibers to impart softness to the fibers. In the method for treating fibers of the present invention, a treatment liquid obtained by diluting the softening agent of the present invention with water can be used.

Further, the method for treating fibers of the present invention may be a method for treating a textile product including bringing a treatment liquid into contact with the textile product, the treatment liquid being obtained by mixing the softening agent of the present invention with water. The textile product may be a textile product explained in the softening agent of the present invention, and examples include, for example, a textile and cloth.

Further, the method for treating fibers of the present invention may be a method for treating a textile product including bringing the softening agent of the present invention into contact with the textile product.

In the present invention, components (A) and (B) are used in an amount that a total treatment concentration is, from the viewpoint of softening performance, 0.01% o.w.f. or more, preferably 0.05% o.w.f. or more, more preferably 0.1% o.w.f. or more, further preferably 0.2% o.w.f. or more and furthermore preferably 0.3% o.w.f. or more, and from the viewpoint of texture, 5% o.w.f. or less, preferably 4% o.w.f. or less, more preferably 3% o.w.f. or less and further preferably 2% o.w.f. or less relative to the fibers. Note that % o.w.f. stands for % on the weight of fabric, and means a percentage of a total mass of components (A) and (B) relative to a mass of the fibers. In the present invention, the softening agent of the present invention or the treatment liquid obtained by mixing the softening agent of the present invention with water can be brought into contact with the fibers. For example, the treatment liquid can be used such that a total of components (A) and (B) relative to the fibers falls within the above range.

The water mixed with the softening agent preferably contains a hardness component. The hardness component is calcium and magnesium, and an amount of all the hardness components contained in the water is expressed as a concentration of calcium compounds in a unit water volume by German hardness, American hardness or the like. An amount of all the hardness components is expressed in terms of CaO in mg/100 ml of water (unit: ° DH) by German hardness, and an amount of all the hardness components is expressed in terms of $CaCO_3$ in mg/L (unit: ppm) by American hardness. They have the following relationship: American hardness (ppm)=German hardness (° DH)×17.85.

In the present invention, the softening agent of the present invention is preferably used by mixing with water having a hardness (German hardness) of 0° DH or more and 30° DH or less. In other words, the fibers are preferably treated with a treatment liquid obtained by mixing the softening agent with water having a hardness of 0° DH or more and 30° DH or less. The water has a hardness of preferably 1° DH or more, more preferably 2° DH or more and further preferably 3° DH or more from the viewpoint of softening performance, and preferably 25° DH or less and more preferably 20° DH or less from the viewpoint of texture.

In the present invention, a hardness (German hardness) in the treatment liquid obtained by mixing the softening agent of the present invention with water is preferably 0° DH or more and 30° DH or less. In other words, the fibers are preferably treated with a treatment liquid having a hardness of 0° DH or more and 30° DH or less. The treatment liquid has a hardness of preferably 1° DH or more, more preferably 2° DH or more and further preferably 3° DH or more from the viewpoint of softening performance, and preferably 25° DH or less and more preferably 20° DH or less from the viewpoint of texture.

The method for treating fibers of the present invention can be directed to the fibers stated in the softening agent of the present invention. For example, the fibers may be fibers of a fabric. The method for treating fibers of the present invention may be a method for treating a textile including bringing a treatment liquid into contact with the textile, the treatment liquid being obtained by mixing the softening agent of the present invention with water.

The method for treating fibers of the present invention can be carried out by incorporating into a laundering process of the fibers, for example, fibers of a fabric. Here, the laundering process may be any of washing, rinsing and dewatering treatments of the fibers.

In the present invention, in any of these laundering processes, the softening agent of the present invention can be applied to the fibers such that a total of components (A) and (B) is a predetermined amount.

The following aspects of the present invention are described by way of example. The matters stated in the softening agent and the method for treating fibers of the present invention can be appropriately applied to these aspects.

<1>

A softening agent containing (A) a compound represented by the following formula (1) [hereinafter referred to as component (A)], and (B) an alcohol with 6 or more carbons [hereinafter referred to as component (B)], (1)

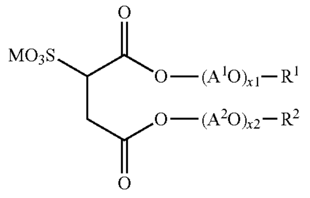

wherein $R^1$ and $R^2$ each represent a hydrocarbon group with 6 or more and 24 or less carbons, with the proviso that at least one of R and $R^2$ is a hydrocarbon group having a branch chain, $A^1O$ and $A^2O$ each represent an alkyleneoxy group with 2 or more and 4 or less carbons, x1 and x2 each represent an average number of added moles, which is a number of 0 or more and 10 or less, and M is a cation.

<2>

The softening agent according to <1>, wherein the hydrocarbon groups of $R^1$ and $R^2$ in the formula (1) are alkyl groups or alkenyl groups.

<3>

The softening agent according to <1> or <2>, wherein the hydrocarbon groups of $R^1$ and $R^2$ in the formula (1) each have preferably 8 or more and more preferably 10 or more, and preferably 20 or less, more preferably 17 or less and further preferably 12 or less carbons.

<4>

The softening agent according to any of <1> to <3>, wherein $R^1$ and $R^2$ in the formula (1) each independently represent preferably a branched hydrocarbon group with 10 or more and 12 or less carbons and more preferably a branched hydrocarbon group with 10 carbons.

<5>

The softening agent according to any of <1> to <4>, wherein a total carbon number of $R^1$ and $R^2$ in the formula (1) is preferably 18 or more and more preferably 20 or more, and preferably 30 or less, more preferably 28 or less, further preferably 26 or less, further preferably 25 or less, further preferably 24 or less, further preferably 22 or less and further preferably 20 or less.

<6>

The softening agent according to any of <1> to <5>, wherein the hydrocarbon groups of $R^1$ and $R^2$ in the formula (1) are the same.

<7>

The softening agent according to any of <1> to <5>, wherein $R^1$ and $R^2$ in the formula (1) have different numbers of carbons.

<8>

The softening agent according to any of <1> to <7>, wherein the hydrocarbon groups having a branch structure of $R^1$ and $R^2$ in the formula (1) each have preferably 1 or more and 2 or less, more preferably 1 or more and 1.5 or less, further preferably 1 or more and 1.2 or less, furthermore preferably 1 or more and 1.1 or less and furthermore preferably 1 branch.

<9>

The softening agent according to any of <1> to <8>, wherein the hydrocarbon groups of $R^1$ and $R^2$ having a branch structure are each preferably a hydrocarbon group having a branch chain at position 2, more preferably a hydrocarbon group having a branch chain at position 2, the branch chain having 2 or more carbons, further preferably an alkyl group having a branch chain at position 2, the branch chain having 2 or more carbons, furthermore preferably a hydrocarbon group having a branch chain at position 2, the branch chain being derived from a Guerbet alcohol and furthermore preferably a hydrocarbon group having a branch chain only at position 2, the branch chain being derived from a Guerbet alcohol.

<10>

The softening agent according to any of <1> to <9>, wherein a proportion of a hydrocarbon group having a branch structure on carbon at position 2 or any of subsequent positions and having only one methyl group bonded to carbon at position 2 (hereinafter described also as hydrocarbon group B2 of $R^1$ and $R^2$) in the hydrocarbon groups having a branch structure of the hydrocarbon groups of $R^1$ and $R^2$ in the formula (1) is preferably 5 mol % or less, more preferably 4 mol % or less, further preferably 3 mol % or less, furthermore preferably 2 mol % or less, furthermore preferably 1 mol % or less and furthermore preferably 0 mol % in all the hydrocarbon groups of $R^1$ and $R^2$.

<11>

The softening agent according to <10>, wherein hydrocarbon group B2 of $R^1$ and $R^2$ is a hydrocarbon group represented by the formula (2):

Formula (2)

$$—CH_2—CH(CH_3)—R^{21}$$

wherein $R^{21}$ is a hydrocarbon group with 3 or more and 21 or less carbons.

<12>

The softening agent according to <11>, wherein $R^{21}$ in the formula (2) is preferably an alkyl group, more preferably a straight chain alkyl group and further preferably a primary straight chain alkyl group.

<13>

The softening agent according to <11> or <12>, wherein $R^{21}$ in the formula (2) has preferably 5 or more and more preferably 6 or more, and from the viewpoint of dispersibility, preferably 17 or less and more preferably 14 or less carbons.

<14>

The softening agent according to any of <1> to <13>, wherein x1 and x2 in the formula (1) are preferably 6 or less, more preferably 4 or less, further preferably 2 or less and furthermore preferably 0.

<15>

The softening agent according to any of <1> to <14>, wherein M in the formula (1) is selected from an alkali metal ion, an alkaline earth metal ion and an organic ammonium ion.

<16>

The softening agent according to any of <1> to <15>, wherein M in the formula (1) is selected from a lithium ion, a sodium ion, a potassium ion, a calcium ion, a barium ion, a triethanolammonium ion, a diethanolammonium ion, a monoethanolammonium ion, a trimethylammonium ion and a monomethylammonium ion.

<17>

The softening agent according to any of <1> to <16>, wherein M is preferably an alkali metal ion or an alkanolammonium ion, more preferably a sodium ion, a potassium ion, a triethanolammonium ion, a diethanolammonium ion or a monoethanolammonium ion and further preferably a sodium ion.

<18>

The softening agent according to any of <1> to <17>, wherein component (A) is preferably one or more selected from a di(2-propylheptyl)sulfosuccinate, a di(isodecyl) sulfosuccinate and a di(2-butyloctyl)sulfosuccinate and more preferably a di(2-propylheptyl)sulfosuccinate.

<19>

The softening agent according to <18>, wherein the salts for component (A) are preferably alkali metal salts or alkanolamine salts, more preferably sodium salts, potassium salts, triethanolamine salts, diethanolamine salts or monoethanolamine salts and further preferably sodium salts.

<20>

The softening agent according to any of <1> to <19>, wherein component (B) is an aliphatic alcohol.

<21>

The softening agent according to any of <1> to <20>, wherein component (B) is an alcohol with 6 or more and 14 or less carbons.

<22>

The softening agent according to any of <1> to <21>, wherein component (B) is preferably a monohydric aliphatic primary alcohol with 6 or more and 14 or less carbons and more preferably a monohydric primary alcohol with 6 or more and 14 or less carbons.

<23>

The softening agent according to any of <1> to <22>, containing components (A) and (B) as active components.

<24>

The softening agent according to any of <1> to <23>, wherein a proportion of component (B) relative to a total of 100 parts by mass of components (A) and (B) is preferably 10 parts by mass or more and more preferably 20 parts by mass or more, and preferably 50 parts by mass or less, more preferably 45 parts by mass or less, further preferably 40 parts by mass or less, furthermore preferably 30 parts by mass or less and furthermore preferably 25 parts by mass or less.

<25>

The softening agent according to any of <1> to <24>, containing water.

<26>

The softening agent according to <25>, containing water in an amount of 70 mass % or more, further 80 mass % or more and further 90 mass % or more, and 99 mass % or less, further 96 mass % or less and further 93 mass % or less.

<27>

The softening agent according to <25> or <26>, wherein water is the balance of a composition containing component (A), component (B) and an optional component.

<28>

The softening agent according to any of <1> to <27>, wherein the agent is used by diluting with water containing a hardness component.

<29>

The softening agent according to any of <1> to <28>, wherein the agent is directed to fibers or directed to natural fibers, synthetic fibers or semi-synthetic fibers or directed to a textile product containing these fibers.

<30>

The softening agent according to <29>, wherein preferable textile products are cloth such as a woven material, a knitted material or the like and a woven textile, and a preferable textile product is a textile product containing cotton fiber and more preferably cloth or a textile formed by weaving cotton fiber.

<31>

The softening agent according to <29> or <30>, wherein the fibers are fibers containing cotton fiber.

<32>

The softening agent according to any of <29> to <31>, wherein a content of cotton fiber in the fibers is preferably 5 mass % or more, more preferably 10 mass % or more, further preferably 15 mass % or more, furthermore preferably 20 mass % or more and furthermore preferably 100 mass %.

<33>

The softening agent according to any of <29> to <32>, wherein a content of cotton fiber in the textile product is preferably 5 mass % or more, more preferably 10 mass- or more, further preferably 15 mass % or more, furthermore preferably 20 mass or more and furthermore preferably 100 mass %.

<34>

A method for treating fibers including bringing a treatment liquid into contact with the fibers, the treatment liquid being obtained by mixing the softening agent according to any of <1> to <33> with water.

<35>

The method for treating fibers according to <34>, wherein the water contains a hardness component.

<36>

The method for treating fibers according to <34> or <35>, wherein the fibers are treated with a treatment liquid obtained by mixing the softening agent with water having a hardness of 0° DH or more and 30° DH or less.

<37>

The method for treating fibers according to any of <34> to <36>, wherein the water has a hardness of preferably 1° DH or more, more preferably 2° DH or more and further preferably 3° DH or more, and preferably 25° DH or less and more preferably 20° DH or less.

<38>

The method for treating fibers according to any of <34> to <37>, wherein a hardness (German hardness) in the treatment liquid is 0° DH or more and 30° DH or less.

<39>

The method for treating fibers according to any of <34> to <38>, wherein the treatment liquid has a hardness of preferably 1° DH or more, more preferably 2° DH or more and further preferably 3° DH or more, and preferably 25° DH or less and more preferably 20° DH or less.

<40>

The method for treating fibers according to any of <34> to <39>, wherein the treatment liquid is brought into contact with a textile product.

<41>

The method for treating fibers according to <40>, wherein the textile product is a textile.

<42>

The method for treating fibers according to <40>, wherein the textile product is cloth.

<43>

The method for treating fibers according to any of <34> to <42>, wherein components (A) and (B) are used in an amount that a total treatment concentration is from 0.01% o.w.f. or more to 5% o.w.f. or less relative to the fibers.

<44>

The method for treating fibers according to any of <34> to <43>, wherein components (A) and (B) are used in an amount that a total treatment concentration is preferably 0.05% o.w.f. or more, more preferably 0.1% o.w.f. or more, further preferably 0.2% o.w.f. or more and furthermore preferably 0.3% o.w.f. or more, and 5% o.w.f. or less, preferably 4% o.w.f. or less, more preferably 3% o.w.f. or less and further preferably 2% o.w.f. or less relative to the fibers.

<45>

The method for treating fibers according to any of <34> to <44>, wherein the method is carried out by incorporating into a laundering process of the fibers.

<46>

The method for treating fibers according to <45>, wherein the laundering process is selected from washing, rinsing and dewatering treatments of the fibers.

EXAMPLES

Production Example 1

Sodium di(2-propylheptyl)sulfosuccinate shown in Tables 1 to 2 was prepared as follows. 176.5 g (1.8 mol) of maleic anhydrate, 626.6 g (4.0 mol) of 2-propylheptanol and 2.5 g (0.013 mol) of p-toluenesulfonic acid monohydrate were prepared in a four-neck flask with a capacity of 2 L equipped with a stirrer, a heating system, a distillation column and a nitrogen/vacuum connection, and after nitrogen replacement, the reaction was carried out with dehydration at 100 to 130° C. under nitrogen bubbling until an acid value decreased to an amount equivalent to p-toluenesulfonic acid. Subsequently, a catalyst adsorption treatment was carried out by using KYOWARD 500SH (manufactured by Kyowa Chemical Industry Co., Ltd.) in an amount of 1 mass % relative to a total amount of the contents within the reaction vessel. After the removal of the adsorbent, residual alcohol was removed by topping to obtain a diester maleate.

Next, 2.78 g (0.70 mol) of the diester maleate obtained above, 73 g (0.38 mol) of sodium disulfite and 48 g (2.7 mol) of ion exchange water were prepared in a 1-L glass reaction vessel, and the reaction was carried out at 115° C. by a publicly-known method using an alcohol-based polar solvent until a double bond derived from the diester maleate disappeared in NMR. After the reaction product was cooled to 50 to 65° C. and remaining sodium hydrogen sulfite was subjected to an oxidization treatment with 30% hydrogen peroxide, a pH was adjusted to 5 with 10% NaOH. The solvent and sodium sulfate were removed by distillation under reduced pressure, reprecipitation, liquid separation or the like to obtain sodium di(2-propylheptyl)sulfosuccinate. Note that the following components were used for producing sodium di(2-propylheptyl)sulfosuccinate.

- Maleic anhydrate: manufactured by FUJIFILM Wako Pure Chemical Corporation, Wako Special Grade
- 2-propylheptanol: manufactured by FUJIFILM Wako Pure Chemical Corporation, Guaranteed Reagent
- p-toluenesulfonic acid monohydrate: manufactured by FUJIFILM Wako Pure Chemical Corporation, Guaranteed Reagent
- Sodium disulfite: manufactured by FUJIFILM Wako Pure Chemical Corporation, Guaranteed Reagent

Production Example 2

Sodium di(isodecyl)sulfosuccinate shown in Table 3 was prepared as follows.

Sodium di(isodecyl)sulfosuccinate was obtained by the same method as in production example 1 except that 626.6 g (4.0 mol) of isodecyl alcohol (decanol manufactured by KH Neochem Co., Ltd.) was used instead of using 626.6 g (4.0 mol) of 2-propylheptanol.

Example and Reference Example

Softening agents each containing any combination of the following components (A) and (B) were prepared, a treatment liquid was prepared by using each of these softening agents, and a softening performance evaluation of each softening agent of the present invention was performed by the evaluation method described later. Specifically, a predetermined treatment liquid was prepared by using an aqueous dispersion containing components (A) and (B) in proportions shown in Tables 1 to 3 and having a total content of components (A) and (B) of 5 mass % (which is the softening agent of the present invention), and a softening performance evaluation of the softening agent of the present invention was performed by using this treatment liquid.

<Component (A)>

- Sodium di(2-propylheptyl)sulfosuccinate
- Sodium di(isodecyl)sulfosuccinate

<Component (B)>

- 1-heptanol manufactured by FUJIFILM Wako Pure Chemical Corporation
- 1-octanol manufactured by FUJIFILM Wako Pure Chemical Corporation
- 1-nonanol manufactured by FUJIFILM Wako Pure Chemical Corporation
- 1-dodecanol, KALCOL 2098 manufactured by Kao Corporation
- 1-tetradecanol, KALCOL 4098 manufactured by Kao Corporation <Method for Evaluating Softening Performance>

1) Pretreatment of Towel for Evaluation

Towels from which starching agents and impurities had been removed in advance by performing the following treatment were used as towels for evaluation.

Using an automatic washing machine (Model number NA-F60PB3 manufactured by Panasonic Corporation), a series of laundering processes (water amount 50 L, washing for 10 minutes→water-saving rinsing twice→dewatering for 9 minutes) was repeated three times on 24 commercially available cotton towels (TW220 manufactured by Takei Towel Co., Ltd., white) by adding 52.22 g of a 10% diluted liquid of a nonionic surfactant (EMULGEN 108 manufactured by Kao Corporation) as a detergent and using tap water of Wakayama city (the tap water is water having a hardness of 4° DH, and the same applies hereinafter) as water. Subsequently, the series of laundering processes was repeated twice with water alone. After that, the towels were naturally dried by leaving them alone at a room temperature (25° C.) for 24 hours.

2) Method for Treating Towel

After a treatment liquid was prepared in such a manner that a predetermined amount of ion exchange water (bath ratio 25 L/kg-towel) was put into Mini Mini Washing Machine (model number NA-35 manufactured in the name of National), an aqueous calcium chloride solution (equivalent to 4000° DH) was added as necessary to condition a hardness to a hardness shown in Tables 1 to 3, and a 5 mass % aqueous dispersion of softening agent components containing components (A) and (B) in proportions shown in Tables 1 to 3 was added under stirring and stirred for 1 minute, three cotton towels (a total of about 210 g) pretreated in the above 1) were put thereinto and treated for 5 minutes under stirring.

A total use amount of components (A) and (B) in this treatment was a treatment concentration (% o.w.f.) relative to the three cotton towels shown in Tables 1 to 3. Subsequently, the cotton towels were dewatered for 3 minutes in a dewatering tub of a twin tub washing machine (model number VH-52G(H) manufactured by TOSHIBA CORPORATION), and dried for 24 hours in a constant-temperature constant-humidity room at 23° C. and 40% RH.

3) Evaluation of Softening Performance

As a reference, a cotton towel treated by the above methods 1) and 2) in accordance with the formula described in each score below was prepared.

Softening performance was evaluated by comparing the softness of a cotton towel treated with the treatment liquid containing softening agent components containing components (A) and (B) in proportions shown in Tables 1 to 3 with the softness of a reference cotton towel. Five panelists each gave a score (point) on the basis of the following criteria to perform an evaluation, and the average thereof was determined as a softening score. Note that, in the evaluation, each panelist could make an evaluation with a decimal point between scores.

- Score 1: the same softness as treated with tap water at 20° C. alone
- Score 2: the same softness as treated in accordance with a formula of using an indicator softening base agent in an amount of 0.025% o.w.f. with tap water at 20° C.
- Score 3: the same softness as treated in accordance with a formula of using the indicator softening base agent in an amount of 0.050% o.w.f. with tap water at 20° C.
- Score 4: the same softness as treated in accordance with a formula of using the indicator softening base agent in an amount of 0.075% o.w.f. with tap water at 20° C.
- Score 5: the same softness as treated in accordance with a formula of using the indicator softening base agent in an amount of 0.100% o.w.f. with tap water at 20° C.

Here, as the indicator softening base agent, an ester amide hydrochloride (2-[N-[3-alkanoyl(C14-20)aminopropyl]-N-methylamino]ethyl alkano(C14-20)ate hydrochloride) was used.

Next, on the basis of the formula below, a softness improvement rate [%] was calculated from the softening score of each example. The results are shown in Tables 1 to 3. Note that "softening score of reference" in the following formula represents the softening score of the reference example of each table. The higher a softness improvement rate is, the more excellent the effect of imparting softness is. Further, in the present invention, if a use amount of component (A) is less than the reference example of each table (reference) and a softness improvement rate [%] is equal to or more than the reference example of each table (reference), the effect of imparting softness is considered to be excellent from the viewpoint of reducing costly component (A).

$$\text{Softness improvement rate [\%]} = 100 \times [(\text{softening score of example}) - (\text{softening score of reference})] / (\text{softening score of reference})$$

TABLE 3

| | | | | Example | | Reference |
|---|---|---|---|---|---|---|
| | | | | 3-1 | 3-2 | example |
| Treatment liquid | Softening agent component [parts by mass] | (A) | Sodium di(isodecyl) sulfosuccinate | 80 | 80 | 100 |
| | | (B) | 1-octanol | 20 | | |
| | | | 1-tetradecanol | | 20 | |
| | | | Total | 100 | 100 | 100 |
| | Hardness of treatment liquid [° DH] | | | 20 | 20 | 20 |
| | Treatment concentration [% o.w.f.] | | | 0.3 | 0.3 | 0.24 |
| Softening performance evaluation | | | Softness improvement rate [%] | 16 | 16 | Reference |

The invention claimed is:

1. A softening agent comprising:

a component (A) which is sodium di(2-propylheptyl) sulfosuccinate; and a component (B) which is at least one alcohol selected from the 1-heptanol, 1-octanol, 1-nonanol, 1-decanol, 1-undecanol, 1-dodecanol, 1-tridecanol, and 1-tetradecanol, wherein a proportion of the component (A) relative to a total of 100 parts by mass of the components (A) and (B) is 50 parts by mass to 90 parts by mass, and a

TABLE 1

| | | | | Example | | | | Reference |
|---|---|---|---|---|---|---|---|---|
| | | | | 1-1 | 1-2 | 1-3 | 1-4 | example |
| Treatment liquid | Softening agent component [parts by mass] | (A) | Sodium di(2-propylheptyl) sulfosuccinate | 80 | 80 | 70 | 80 | 100 |
| | | (B) | 1-octanol | 20 | | | | |
| | | | 1-nonanol | | 20 | | | |
| | | | 1-dodecanol | | | 30 | | |
| | | | 1 -tetradecanol | | | | 20 | |
| | | | Total | 100 | 100 | 100 | 100 | 100 |
| | Hardness of treatment liquid [° DH] | | | 4 | 4 | 4 | 4 | 4 |
| | Treatment concentration [% o.w.f.] | | | 0.3 | 0.3 | 0.3 | 0.3 | 0.24 |
| Softening performance evaluation | | | Softness improvement rate [%] | 42 | 37 | 32 | 42 | Reference |

| | | | | Example | | | | | | | | | | | Reference |
|---|---|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 | 2-11 | example |
| Treatment liquid | Softening agent component [parts by mass] | (A) | Sodium di(2-propylheptyl) sulfosuccinate | 80 | 80 | 80 | 90 | 80 | 70 | 90 | 80 | 70 | 50 | 80 | 100 |
| | | (B) | 1-heptanol | 20 | | | | | | | | | | | |
| | | | 1-octanol | | 20 | | | | | | | | | | |
| | | | 1-nonanol | | | 20 | | | | | | | | | |
| | | | 1-dodecanol | | | | 10 | 20 | 30 | | | | | | |
| | | | 1-tetradecanol | | | | | | | 10 | 20 | 30 | 50 | 20 | |
| | | | Total | 100 | 100 | 100 | 100 | 100 | 100 | 100 | 100 | 100 | 100 | 100 | 100 |
| | Hardness of treatment liquid [° DH] | | | 20 | 20 | 20 | 20 | 20 | 20 | 20 | 20 | 20 | 20 | 20 | 20 |
| | Treatment concentration [% o.w.f.] | | | 0.3 | 0.3 | 0.3 | 0.3 | 0.3 | 0.3 | 0.3 | 0.3 | 0.3 | 0.3 | 1.0 | 0.24 |
| Softening performance evaluation | | | Softness improvement rate [%] | 29 | 30 | 29 | 29 | 38 | 19 | 29 | 29 | 19 | 4 | 50 | Reference |

proportion of the component (B) relative to the total of 100 parts by mass of the components (A) and (B) is 10 parts by mass to 50 parts by mass.

2. A treatment liquid comprising:

the softening agent according to claim 1; and water comprising a hardness component.

3. The softening agent according to claim 1, wherein a proportion of the component (B) relative to a total of 100 parts by mass of the components (A) and (B) is 20 parts by mass to 40 parts by mass.

4. The softening agent according to claim 1, wherein a proportion of the component (B) relative to a total of 100 parts by mass of the components (A) and (B) is 20 parts by mass to 30 parts by mass.

5. A method for treating fibers comprising bringing a treatment liquid into contact with the fibers, the treatment liquid comprising a softening agent and water, the softening agent comprising:

a component (A) which is sodium di(2-propylheptyl) sulfosuccinate; and a component (B) which is at least one alcohol selected from the 1-heptanol, 1-octanol, 1-nonanol, 1-decanol, 1-undecanol, 1-dodecanol, 1-tridecanol, and 1-tetradecanol, wherein a proportion of the component (A) relative to a total of 100 parts by mass of the components (A) and (B) is 50 parts by mass to 90 parts by mass, and a proportion of the component (B) relative to the total of 100 parts by mass of the components (A) and (B) is 10 parts by mass to 50 parts by mass

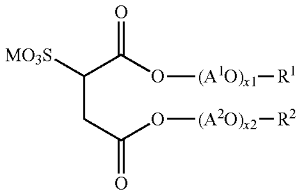

(1)

wherein $R^1$ and $R^2$ each independently represent a hydrocarbon group with 6 or more and 24 or less carbons, with the proviso that at least one of $R^1$ and $R^2$ is a hydrocarbon group having a branch chain, $A^1O$ and $A^2O$ each independently represent an alkyleneoxy group with 2 or more and 4 or less carbons, x1 and x2 each independently represent an average number of added moles, which is a number of 0 or more and 10 or less, and M is a cation.

6. The method for treating fibers according to claim 5, wherein the water comprises a hardness component.

7. The method for treating fibers according to claim 5, wherein the treatment liquid is brought into contact with a textile product.

8. The method for treating fibers according to claim 7, wherein the textile product is a textile.

9. The method for treating fibers according to claim 7, wherein the textile product is cloth.

10. The method for treating fibers according to claim 5, wherein an amount of a total of the components (A) and (B) in the treatment liquid is from 0.01% o.w.f. or more to 5% o.w.f. or less relative to a weight of the fibers.

* * * * *